(12) United States Patent
Lin et al.

(10) Patent No.: US 12,657,698 B2
(45) Date of Patent: Jun. 16, 2026

(54) PREDICTING A LIKELIHOOD THAT AN INDIVIDUAL HAS ONE OR MORE LESIONS

(71) Applicant: KONINKLIJKE PHILIPS N.V., Eindhoven (NL)

(72) Inventors: Qizhong Lin, Shanghai (CN); Xianghui Bai, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 293 days.

(21) Appl. No.: 18/038,863

(22) PCT Filed: Nov. 29, 2021

(86) PCT No.: PCT/EP2021/083266
§ 371 (c)(1),
(2) Date: May 25, 2023

(87) PCT Pub. No.: WO2022/112540
PCT Pub. Date: Jun. 2, 2022

(65) Prior Publication Data
US 2024/0212132 A1 Jun. 27, 2024

(30) Foreign Application Priority Data

Nov. 30, 2020 (WO) ................. PCT/CN2020/132646
Jan. 22, 2021 (EP) .................................... 21153104

(51) Int. Cl.
$G06T\ 7/00$ (2017.01)
$G06T\ 7/174$ (2017.01)
$G06T\ 7/38$ (2017.01)

(52) U.S. Cl.
CPC ............ $G06T\ 7/0012$ (2013.01); $G06T\ 7/174$ (2017.01); $G06T\ 7/38$ (2017.01);
(Continued)

(58) Field of Classification Search
CPC ......... G06T 7/0012; G06T 7/174; G06T 7/38; G06T 2207/10016; G06T 2207/10132;
(Continued)

(56) References Cited

U.S. PATENT DOCUMENTS 5,997,479 A 12/1999 Savord et al.
6,013,032 A 1/2000 Savord
(Continued)

FOREIGN PATENT DOCUMENTS

WO 2019243344 A1 12/2019

OTHER PUBLICATIONS

International Search Report and Written Opinion for PCT/EP2021/083266; Mailing date: Mar. 15, 2022, 18 pages.
(Continued)

*Primary Examiner* — Molly Wilburn

(57) ABSTRACT

A mechanism for identifying the presence/absence of one or more lesions in a plurality of ultrasound images. The ultrasound images are processed to identify regions of interest in each image, each region of interest representing a part of the ultrasound image suspected to depict a lesion. Similar regions of interest are grouped together, and the groups of similar regions are then processed using a machine-learning method to predict whether or not they contain a lesion of interest. Thus, a two-step process for identifying a lesion of interest is performed.

16 Claims, 7 Drawing Sheets

(52) U.S. Cl.
 CPC .............. *G06T 2207/10016* (2013.01); *G06T 2207/10132* (2013.01); *G06T 2207/20081* (2013.01); *G06T 2207/20084* (2013.01); *G06T 2207/30096* (2013.01)

(58) Field of Classification Search
 CPC . G06T 2207/20081; G06T 2207/20084; G06T 2207/30096; G06T 7/248; G06T 2207/20132; G06T 2207/20221
 See application file for complete search history.

(56) References Cited

U.S. PATENT DOCUMENTS

| | | | |
|---|---|---|---|
| 6,283,919 B1 | 9/2001 | Roundhill et al. | |
| 6,443,896 B1 | 9/2002 | Detmer | |
| 6,458,083 B1 | 10/2002 | Jago et al. | |
| 6,530,885 B1 | 3/2003 | Entrekin et al. | |
| 6,623,432 B2 | 9/2003 | Powers et al. | |
| 11,948,687 B2* | 4/2024 | Jaber | G06N 3/0464 |
| 2015/0230773 A1* | 8/2015 | Cho | A61B 6/502 |
| | | | 382/128 |
| 2016/0019320 A1 | 1/2016 | Kim et al. | |
| 2016/0148376 A1 | 5/2016 | Ryu | |
| 2018/0053300 A1 | 2/2018 | Podilchuk et al. | |
| 2018/0276821 A1* | 9/2018 | Lin | A61B 8/5223 |
| 2019/0122073 A1 | 4/2019 | Ozdemir et al. | |
| 2020/0121294 A1 | 4/2020 | Tsymbalenko et al. | |
| 2021/0241886 A1* | 8/2021 | Noguchi | G06T 7/62 |
| 2021/0312652 A1* | 10/2021 | Padwal | A61B 8/4461 |
| 2021/0334970 A1* | 10/2021 | Liu | G06V 10/454 |
| 2022/0067919 A1* | 3/2022 | Shriram | G06V 10/25 |
| 2022/0139531 A1* | 5/2022 | Wang | G16H 50/20 |
| | | | 382/128 |
| 2023/0103969 A1* | 4/2023 | St. Pierre | G06T 7/0014 |
| | | | 382/128 |
| 2023/0172535 A1* | 6/2023 | Oubel | A61B 5/4848 |
| | | | 382/128 |

OTHER PUBLICATIONS

Li, Y. et al., "3D tumor detection in automated breast ultrasound using deep convolutional neural network", Med Phys., 2020, vol. 47, No. 11, pp. 5669-5680.
Kang, K. et al., "Object Detection in Videos with Tubelet Proposal Networks", arXiv:1702.06355v2, 2017, 9 pages.
Li, W. et al., "Deformable Tube Network for Action Detection in Videos", arXiv:1907.01847v1, 2019, 14 pages.
Agarwal, S. et al., "Recent Advances in Object Detection in the Age of Deep Convolutional Neural Networks", 2019, arXiv:1809.03193v2, 104 pages.
Mohamed, F. et al., "A Survey on 3D Ultrasound Reconstruction Techniques", Artificial Intelligence—Applications in Medicine and Biology, 2019, 21 pages.
Anonymous, "Breast Cancer Facts and Statistics", retrieved from https://www.breastcancer.org/facts-statistics, 2023, 6 pages.

Brenner, H. et al., "Recent major progress in long-term cancer patient survival disclosed by modeled period analysis", Journal Clin Oncol., 2007, vol. 25, No. 22, pp. 3274-3280.
Blanks, R.G., "A comparison of cancer detection rates achieved by breast cancer screening programmes by number of readers, for one and two view mammography: results from the UK National Health Service breast screening programme", Journal Med Screen, 1998, vol. 5, No. 4, pp. 195-201.
Doi, K. et al., "Computer-aided diagnosis in medical imaging: historical review, current status and future potential", Computerized Medical Imaging and Graphics, 2007, vol. 31, Issues 4-5, pp. 198-2011.
Chen, D-R. et al., "Computer-aided Diagnosis in Breast Ultrasound", Journal of Medical Ultrasound, 2008, vol. 16, Issue 1, pp. 46-56.
Cupples, T. et al., "Impact of computer-aided detection in a regional screening mammography program", AJR Am J Roentgenol., 2005, vol. 85, Issue 4, pp. 944-950.
Lee, H. et al., "Image based computer aided diagnosis system for cancer detection", Expert Systems with Applications, 2015, vol. 42, Issue 12, pp. 5356-5536.
Jalalian, A. et al., "Foundation and methodologies in computer-aided diagnosis systems for breast cancer detection", EXCLI Journal, 2017, vol. 16, pp. 113-137.
Lehman, C. et al., "Diagnostic Accuracy of Digital Screening Mammography With and Without Computer-Aided Detection", JAMA Intern Med., 2015, vol. 175, Issue 11, pp. 1828-1837.
Fenton, J. et al., "Influence of computer-aided detection on performance of screening mammography", N Engl J Med., 2007, vol. 356, Issue 14, pp. 1399-13409.
Fenton, J. et al., "Effectiveness of computer-aided detection in community mammography practice", J Natl Cancer Inst., 2011, vol. 103, Issue 15, pp. 1152-1161.
Ding, J. et al., "Accurate Pulmonary Nodule Detection in Computed Tomography Images Using Deep Convolutional Neural Networks", arXiv:1706.04303v3, 2017.
Esteva, A. et al., "Dermatologist-level classification of skin cancer with deep neural networks", Nature, 2017, vol. 542, pp. 115-118.
Gulshan, V. et al., "Development and Validation of a Deep Learning Algorithm for Detection of Diabetic Retinopathy in Retinal Fundus Photographs", JAMA, 2016, vol. 22, pp. 2402-2410.
Cao, Z. et al., "Breast Tumor Detection in Ultrasound Images Using Deep Learning", LNCS, 2017, Abstract Only.
Chiao, J-Y. et al., "Detection and classification the breast tumors using mask R-CNN on sonograms", Medicine, 2019, vol. 98, e15200.
Cao, Z. et al., "An experimental study on breast lesion detection and classification from ultrasound images using deep learning architectures", BMC Med Imaging, 2019, vol. 19, Issue 1, Jul. 1, 2019;19(1):5.
Yap, M.H. et al., "Automated breast ultrasound lesions detection using convolutional neural networks", IEEE J Biomed Health Inform., 2018, vol. 22, No. 4, pp. 1218-1226.
Wang, J. et al., "Region Proposal by Guided Anchoring", arXiv:1901.03278v2, 2019, 12 pages.
Selvaraju, R. et al., "Grad-CAM: Visual Explanations from Deep Networks via Gradient-based Localization", arXiv:1610.02391v3, 2017, 24 pages.

\* cited by examiner 510　　520　　530

610

Memory

US Scanner

Processing System

630

620

600

⌐ 60

710

720

0.86, 0

PREDICTING A LIKELIHOOD THAT AN INDIVIDUAL HAS ONE OR MORE LESIONS

CROSS-REFERENCE TO PRIOR APPLICATIONS

This application is the U.S. National Phase application under 35 U.S.C. § 371 of International Application No. PCT/EP2021/083266, filed on Nov. 29, 2021, which claims the benefit of European Patent Application No. 21153104.1, filed on Jan. 22, 2021, and Chinese Patent Application No. PCT/CN2020/132646, filed Nov. 30, 2020. These applications are hereby incorporated by reference herein.

FIELD OF THE INVENTION

The present invention relates to the field of ultrasound imaging, and in particular to the identification of lesions represented in ultrasound images.

BACKGROUND OF THE INVENTION

Ultrasound is becoming increasingly used in the detection and diagnosis of various cancers, such as breast cancer, thyroid cancer and liver cancer and the like. In particular, early detection of cancers using ultrasound is usually performed by identifying lesions within ultrasound images. Unfortunately, the detection rate of early stage cancer is relatively low due to a number of factors, such as shortage of sufficiently experienced sonographers and time pressures for performing ultrasound imaging screening.

Clinical decision support (CDS) systems, which employ computer-implemented ultrasound-based lesion detection techniques, are being adopted for aiding clinicians in performing ultrasound image screening. Such systems could support clinicians by predicting the presence or absence of one or more lesions, to thereby aid in reducing the likelihood of missed detection and as double reading/confirmation to improve the diagnosis confidence.

Generally, there are two types of method for (automated or computer-implemented) ultrasound-based lesion detection: traditional lesion detection method based on image processing steps and deep learning approaches. The traditional approach is generally not considered sufficiently robust and/or flexible for a large portion of the population, as it relies upon rule based approaches and specific assumptions. Deep learning approaches have shown a superior accuracy in object/lesion detection, as they are less reliant upon such strong assumptions, but suffer from high computational complexity and processing times.

In the paper "3D tumor detection in automated breast ultrasound using deep convolutional neutral network" by LI YANFENG ET AL, published in Medical Physics, vol. 47, no. 11, a tumor detection method is proposed for automated breast ultrasound (ABUS). ABUS is known as an automated ultrasound device for breast screening. ABUS uses 3D ultrasound technology and acquires operator-independent volume images of the breast, and it generates coronal view slices from the acquired 3D volumes and displays such slices.

There is therefore an ongoing desire to improve mechanisms for predicting a likelihood that an individual has one or more lesions.

SUMMARY OF THE INVENTION

The invention is defined by the claims.

According to examples in accordance with an aspect of the invention, there is provided a processing system for predicting a likelihood that an individual has one or more lesions, the processing system being configured to: obtain a plurality of ultrasound images of the individual; identify regions of interest in the plurality of ultrasound images, each region of interest being a part of an ultrasound image of the plurality of ultrasound images that represents an area having a potential lesion in the individual; group regions of interest, from different ultrasound images of the plurality of ultrasound images, together based on a similarity of the regions of interests; and process each group of regions of interest using a machine-learning method to generate a predictive indicator that indicates a likelihood that the group of regions of interest contains a lesion in the individual. The plurality of ultrasound images comprises a temporal sequence of ultrasound images. In some embodiments, the temporal sequence of ultrasound images is a video of ultrasound images, such as a cineloop. Identifying regions of interest that represents an area having a potential lesion comprises identifying the presence, or absence of one or more regions of interest. For some ultrasound images, there can be no region of interest identified in each ultrasound images; for some ultrasound images, there can be one or more regions of interest identified in each ultrasound image.

The present disclosure proposes an approach for identifying the presence, or absence, of one or more lesions in an individual, and in particular to generating one or more predictive indicators that indicate a likelihood that a lesion is present. Ultrasound images of the patient are processed to identify regions of interest (i.e. parts of each ultrasound image) that contain a potential lesion—i.e. a candidate region that is predicted to depict a lesion. A region of interest is therefore part of an ultrasound image, and is therefore an image in its own right (albeit of a smaller size than the ultrasound image). A region of interest contains a potential lesion if it is predicted that the area of the individual represented by the region of interest contains a potential lesion—i.e. is likely to contain a lesion. Mechanisms for identifying regions of interest containing a potential lesion are well known to the skilled person, e.g. and may employ machine-learning methods, edge detection algorithms, image segmentation techniques and the like.

The regions of interest are then grouped or clustered, to produce groups of regions of interest, based on their similarity. In this way, parts of different ultrasound images that correspond to one another (i.e. contain a same potential lesion) are grouped together. Thus, regions of interest may be considered similar to one another (and grouped accordingly) if it is predicted that they contain the same potential lesion in the individual. Furthermore, the grouping or clustering is performed based on the similarity of the regions of interest without the need of relevant spatial relations among the regions of interest. In this way, the grouping or clustering can be performed without spatially aligning the plurality of ultrasound images. This is particularly advantageous for the cases where the plurality of ultrasound images are not spatially aligned. For example, in the case that a plurality of two-dimensional ultrasound images are manually acquired by a hand-held ultrasound probe, relative spatial relationship among these two-dimensional ultrasound images, unlike those acquired by ABUS (automated breast ultrasound), are unknown. Conventionally, such plurality of ultrasound images can be firstly combined into a three dimensional (3D) volume by means of various spatial alignment technologies (e.g. spatial registration. 3D construction), and then further signal processing (such as lesion detection) can be carried out based on spatially aligned images or slices. However, spatial alignment or 3D can be challenging in some scenarios. Contrarily, it is proposed here to group the plurality of regions of interest based on similarities therebetween without relying on any pre-spatial registration or alignment across the plurality of images, or in other words, without relying on any knowledge of the relative spatial relationship among the plurality of images or among the regions of interest identified in the plurality of images.

The groups are then processed using a machine-learning method to generate a predictive indicator that indicates a likelihood that the group contains a lesion of the individual. Thus, the machine-learning method effectively predicts whether or not a lesion is present in the group of regions of interest. In this way, a machine-learning method such as a classifier generates a predictive indicator by processing a group of regions of interest containing the same potential lesion.

In the context of the present invention, a predictive indicator is any data that changes responsive to changes in a predicted likelihood (determined by the machine-learning method) that the group of lesions contains a lesion. The predictive indicator may comprise binary, categorical or numerical data. Binary data may indicate a prediction as to whether or not the group contains a lesion (e.g. "0" indicates predicted absence and "1" indicate predicted presence or vice versa). Categorical data may indicate a likelihood category (e.g. "Likely". "Very Likely". "Unlikely" and so on) that the group contains a lesion. Numerical data may indicate a numeric probability that a group of regions of interest contains a lesion, e.g. on a scale of 0 to 1 or 0 to 100.

The proposed approach reduces a false positive rate of identifying lesions of an individual (e.g. from a still image alone) by making use of multiple ultrasound images, e.g. taken over a period of time, to thereby make use of additional contextual information for identifying the lesion(s) of the individual. By first identifying regions of interest, the amount of processing performed to identify lesions is reduced, e.g. compared to performing a machine-learning process on the entirety of the plurality of ultrasound images without further processing. The proposed approach thereby provides a mechanism for performing high quality and high accuracy lesion identification with reduced computational effort.

Preferably, each ultrasound image is a two-dimensional ultrasound image. The present invention is particularly advantageous when used for processing two-dimensional ultrasound images because ultrasound systems for generating 2D ultrasound images have a broad range of utility and adoption and are becoming increasingly used in resource-restricted, e.g. low-power, environments (e.g. battery-powered or in areas with unreliable electricity). It would therefore be particularly beneficial to reduce a computational burden (to minimize power usage requirements) whilst still obtaining an accurate indicator of a likelihood of a lesion for such systems.

In some embodiments, the processing system is configured to process each group of regions of interest by performing a process comprising, for each group of regions of interest: generating a sequence of regions of interest using the regions of interest of the group of regions of interest; and processing the sequence of regions using a machine-learning method to predict whether or not the sequence of regions contains a lesion in the individual.

The sequence of regions of interest may effectively form a single data structure containing the data from all the regions of interest in the group.

The processing system may be configured to generate a sequence of regions by performing a step comprising stacking the regions of interest. If the regions of interest are two-dimensional images, e.g. extracted from two-dimensional ultrasound images, this process effectively forms a pseudo-3D volume.

The processing system may be configured to identify regions of interest in the ultrasound images by performing a process comprising processing each ultrasound image using a second machine-learning method to identify a region of interest. Thus, at least two machine-learning methods may be used to predict the presence of absence of a lesion. This approach improves the likelihood of identifying potential lesions and facilitates a fully automated mechanism for identifying potential lesions, as well as adopting existing and well-developed mechanisms for identifying potential lesions in ultrasound images for improved reliability.

In some examples, a third machine-learning method is used to group the regions of interest, e.g. using characteristics and/or other metadata of each region of interest (such as a position, a size, a shape and so on). Of course, a machine-learning method may be used to group the regions of interest even if no machine-learning method is used to identify the regions of interest.

In some preferred examples, the plurality of ultrasound images comprises a sequence of ultrasound images. The sequence of ultrasound images is preferably a temporal sequence, so that ultrasound images later in the sequence are obtained by an imaging system later in time than an earlier ultrasound image. This effectively results in time-dependent information being incorporated in the groups of regions of interest. The present disclosure recognizes that use of time-based information increases a change of accurately identifying the presence or absence of one or more lesions.

Preferably, the plurality of ultrasound images are obtained by a same ultrasound imaging system, e.g. using a same ultrasound imaging probe. Even more preferably, the plurality of images are obtained whilst the ultrasound imaging probe (used to obtain the ultrasound images) is stationary. This increases an case and accuracy of identifying groups of linked regions of interest.

In some embodiments, the order of the sequence of ultrasound images is dependent upon a time at which each ultrasound image was captured. For example, the sequence of ultrasound images may comprise sequential frames of an ultrasound video. The context provided by a temporally ordered sequence of ultrasound images (e.g. an ultrasound video) allows time-based information to be taken into account for the machine-learning method when predicting the presence or absence of one or more lesions in the group of regions of interest. The present disclosure identifies that this information is particularly advantageous in reducing the false positive detection rate of one or more lesions in the ultrasound images.

In some examples, each group of regions of interest, each region of interest is from an ultrasound image sequentially adjacent to an ultrasound image for another region of interest in the same group of regions of interest.

Preferably, each region of interest is no greater than 0.4 times the size of the ultrasound image, e.g. no greater than 0.25 times the size of the ultrasound image. The smaller the size of the region of interest, the greater the effect of reducing the computational complexity of processing a group of regions of interest (rather than the entire ultrasound image).

In some examples, the processing system is configured to display a visually-perceptible output, at a display device, responsive to each predictive indicator. Thus, information responsive to the predictive indicators can be output to a user (e.g. a clinician).

The processing system may be configured to, if at least one predictive indicator indicates that at least one group of regions of interest is likely to contain a lesion: identify a position of the identified lesion with respect to a displayed ultrasound image of the patient; and overlay the visually-perceptible output on the displayed ultrasound image responsive to the identified position of the lesion.

The processing system may be configured to group regions of interest by performing a process comprising: determining a similarity measure between different regions of interest from different ultrasound images, a similarity measure representing a size of an overlap between the relative area occupied by one region of interest within an ultrasound image and the relative area occupied by another region of interest of another ultrasound image; and grouping two different regions of interest into a same group in response to the similarity measure between the two different regions of interest exceeding a predetermined threshold.

Thus, the similarity measurement may be based on a size of an overlap, e.g. an Intersection over Union (IoU) measure between regions of interest from different ultrasound images. This facilitates a simple mechanism for identifying whether a same potential lesion is being identified. e.g. as the same potential lesion will likely be at a same relative location of each ultrasound image. This approach is particularly advantageous if the plurality of ultrasound images comprises frames from an ultrasound video, as this embodiment increases the likelihood that a potential lesion will be at a same position between different frames of the ultrasound video.

The processing system may be configured to group regions of interest by performing a process comprising: identifying metadata of the region of interest, the metadata providing information on a size, position, confidence and/or appearance of the region of interest; and grouping regions of interest based on the metadata of the regions of interest. Thus, additional information may be used to decide on a similarity between different regions of interest. In some embodiments, a machine-learning method is used to group regions of interest, e.g. based on the metadata of the regions of interest.

There is also proposed a computer-implemented method for predicting a likelihood that an individual has one or more lesions.

The computer-implemented method comprises: obtaining a plurality of ultrasound images of the individual; identifying regions of interest in the plurality of ultrasound images, each region of interest being a part of an ultrasound image of the plurality of ultrasound images that represents an area having a potential lesion in the individual; grouping regions of interest, from different ultrasound images of the plurality of ultrasound images, together based on a similarity of the regions of interests; and processing each group of regions of interest using a machine-learning method to generate a predictive indicator that indicates a likelihood that the group of regions of interest contains a lesion in the individual.

There is also proposed a processing system comprising a memory and a processor coupled to the memory and configured to perform such computer-implemented method.

There is also proposed a computer program product comprising computer program code means which, when executed on a computing device having a processing system, cause the processing system to perform all of the steps of any herein described computer-implemented method.

The skilled person would be readily capable of adapting any herein described processing system to carry out any herein described method and vice versa.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
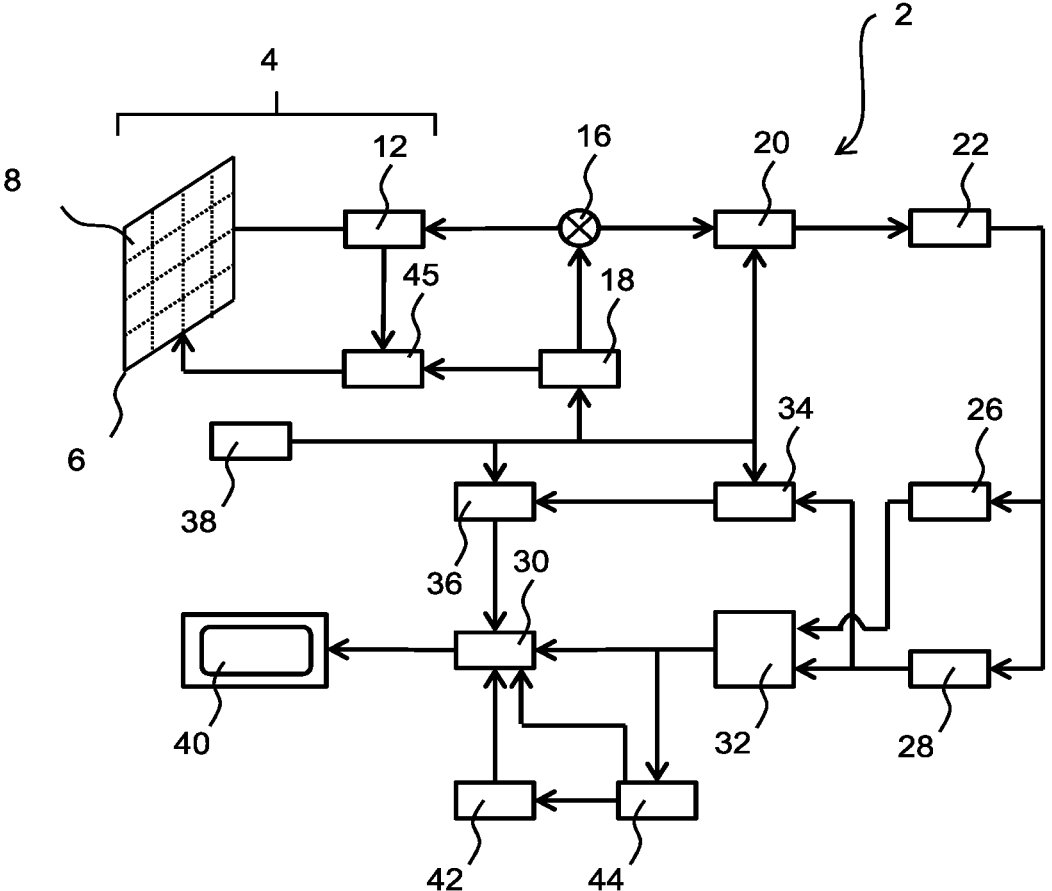
FIG. 1 illustrates an ultrasound system for use with an embodiment.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a mechanism for determining the probability/likelihood of the presence/absence of one or more lesions in an individual by processing a plurality of ultrasound images of the individual. The ultrasound images are processed to identify regions of interest in each image, each region of interest representing a part of the ultrasound image suspected to depict a lesion. Similar regions of interest are grouped together, and the groups of similar regions are then processed using a machine-learning method to generate a prediction of whether they are likely to contain a lesion of interest. Thus, a two-step process for identifying a likelihood of lesions is performed.

Embodiments of the invention are based on the realization that important information is lost or not present if using only a single ultrasound image to identify a potential lesion, but that processing multiple ultrasound images at a same time significantly increases a processing burden for an image analysis process. Rather, a new approach for assessing the likelihood for the presence and/or absence of potential lesions is proposed, in which groups of regions of interest from different ultrasound images are formed and processed together to predict a likelihood that a lesion is present.

Embodiments may be employed in any suitable ultrasound analysis system, for instance in ultrasound analysis for cancer screening and diagnosis of superficial organ. The proposed embodiments have the potential to be employed in any suitable clinical environment, e.g. during health check-ups for cancer screening, or in a hospital ultrasound department for cancer screening and diagnosis. This invention is applicable to all ultrasound imaging system with advanced lesion identification software for online or off-line use, i.e. processing data from memory or produced directly from an ultrasound system.

The general operation of an exemplary ultrasound system will first be described, with reference to FIG. 1. The present invention makes use of ultrasound images generated by such an ultrasound system, although other approaches and systems for generating ultrasound images will be apparent to the skilled person.

The system comprises an array transducer probe 4 which has a transducer array 6 for transmitting ultrasound waves and receiving echo information. The transducer array 6 may comprise CMUT transducers; piezoelectric transducers, formed of materials such as PZT or PVDF; or any other suitable transducer technology. In this example, the transducer array 6 is a two-dimensional array of transducers 8 capable of scanning either a 2D plane or a three dimensional volume of a region of interest. In another example, the transducer array may be a 1D array.

The transducer array 6 is coupled to a microbeamformer 12 which controls reception of signals by the transducer elements. Microbeamformers are capable of at least partial beamforming of the signals received by sub-arrays, generally referred to as "groups" or "patches", of transducers as described in U.S. Pat. No. 5,997,479 (Savord et al.), U.S. Pat. No. 6,013,032 (Savord), and U.S. Pat. No. 6,623,432 (Powers et al.).

It should be noted that the microbeamformer is entirely optional. Further, the system includes a transmit/receive (T/R) switch 16, which the microbeamformer 12 can be coupled to and which switches the array between transmission and reception modes, and protects the main beamformer 20 from high energy transmit signals in the case where a microbeamformer is not used and the transducer array is operated directly by the main system beamformer. The transmission of ultrasound beams from the transducer array 6 is directed by a transducer controller 18 coupled to the microbeamformer by the T/R switch 16 and a main transmission beamformer (not shown), which can receive input from the user's operation of the user interface or control panel 38. The controller 18 can include transmission circuitry arranged to drive the transducer elements of the array 6 (either directly or via a microbeamformer) during the transmission mode.

In a typical line-by-line imaging sequence, the beamforming system within the probe may operate as follows. During transmission, the beamformer (which may be the micro-beamformer or the main system beamformer depending upon the implementation) activates the transducer array, or a sub-aperture of the transducer array. The sub-aperture may be a one dimensional line of transducers or a two dimensional patch of transducers within the larger array. In transmit mode, the focusing and steering of the ultrasound beam generated by the array, or a sub-aperture of the array, are controlled as described below.

Upon receiving the backscattered echo signals from the subject, the received signals undergo receive beamforming (as described below), in order to align the received signals, and, in the case where a sub-aperture is being used, the sub-aperture is then shifted, for example by one transducer element. The shifted sub-aperture is then activated and the process repeated until all of the transducer elements of the transducer array have been activated.

For each line (or sub-aperture), the total received signal, used to form an associated line of the final ultrasound image, will be a sum of the voltage signals measured by the transducer elements of the given sub-aperture during the receive period. The resulting line signals, following the beamforming process below, are typically referred to as radio frequency (RF) data. Each line signal (RF data set) generated by the various sub-apertures then undergoes additional processing to generate the lines of the final ultrasound image. The change in amplitude of the line signal with time will contribute to the change in brightness of the ultrasound image with depth, wherein a high amplitude peak will correspond to a bright pixel (or collection of pixels) in the final image. A peak appearing near the beginning of the line signal will represent an echo from a shallow structure, whereas peaks appearing progressively later in the line signal will represent echoes from structures at increasing depths within the subject.

One of the functions controlled by the transducer controller 18 is the direction in which beams are steered and focused. Beams may be steered straight ahead from (orthogonal to) the transducer array, or at different angles for a wider field of view. The steering and focusing of the transmit beam may be controlled as a function of transducer element actuation time.

Two methods can be distinguished in general ultrasound data acquisition: plane wave imaging and "beam steered" imaging. The two methods are distinguished by a presence of the beamforming in the transmission ("beam steered" imaging) and/or reception modes (plane wave imaging and "beam steered" imaging).

Looking first to the focusing function, by activating all of the transducer elements at the same time, the transducer array generates a plane wave that diverges as it travels through the subject. In this case, the beam of ultrasonic waves remains unfocused. By introducing a position dependent time delay to the activation of the transducers, it is possible to cause the wave front of the beam to converge at a desired point, referred to as the focal zone. The focal zone is defined as the point at which the lateral beam width is less than half the transmit beam width. In this way, the lateral resolution of the final ultrasound image is improved.

For example, if the time delay causes the transducer elements to activate in a series, beginning with the outermost elements and finishing at the central element(s) of the transducer array, a focal zone would be formed at a given distance away from the probe, in line with the central element(s). The distance of the focal zone from the probe will vary depending on the time delay between each subsequent round of transducer element activations. After the beam passes the focal zone, it will begin to diverge, forming the far field imaging region. It should be noted that for focal zones located close to the transducer array, the ultrasound beam will diverge quickly in the far field leading to beam width artifacts in the final image. Typically, the near field, located between the transducer array and the focal zone, shows little detail due to the large overlap in ultrasound beams. Thus, varying the location of the focal zone can lead to significant changes in the quality of the final image.

It should be noted that, in transmit mode, only one focus may be defined unless the ultrasound image is divided into multiple focal zones (each of which may have a different transmit focus).

In addition, upon receiving the echo signals from within the subject, it is possible to perform the inverse of the above described process in order to perform receive focusing. In other words, the incoming signals may be received by the transducer elements and subject to an electronic time delay before being passed into the system for signal processing. The simplest example of this is referred to as delay-and-sum beamforming. It is possible to dynamically adjust the receive focusing of the transducer array as a function of time.

Looking now to the function of beam steering, through the correct application of time delays to the transducer elements it is possible to impart a desired angle on the ultrasound beam as it leaves the transducer array. For example, by activating a transducer on a first side of the transducer array followed by the remaining transducers in a sequence ending at the opposite side of the array, the wave front of the beam will be angled toward the second side. The size of the steering angle relative to the normal of the transducer array is dependent on the size of the time delay between subsequent transducer element activations.

Further, it is possible to focus a steered beam, wherein the total time delay applied to each transducer element is a sum of both the focusing and steering time delays. In this case, the transducer array is referred to as a phased array.

In case of the CMUT transducers, which require a DC bias voltage for their activation, the transducer controller 18 can be coupled to control a DC bias control 45 for the transducer array. The DC bias control 45 sets DC bias voltage(s) that are applied to the CMUT transducer elements.

For each transducer element of the transducer array, analog ultrasound signals, typically referred to as channel data, enter the system by way of the reception channel. In the reception channel, partially beamformed signals are produced from the channel data by the microbeamformer 12 and are then passed to a main receive beamformer 20 where the partially beamformed signals from individual patches of transducers are combined into a fully beamformed signal, referred to as radio frequency (RF) data. The beamforming performed at each stage may be carried out as described above, or may include additional functions. For example, the main beamformer 20 may have 128 channels, each of which receives a partially beamformed signal from a patch of dozens or hundreds of transducer elements. In this way, the signals received by thousands of transducers of a transducer array can contribute efficiently to a single beamformed signal.

The beamformed reception signals are coupled to a signal processor 22. The signal processor 22 can process the received echo signals in various ways, such as: band-pass filtering; decimation; I and Q component separation; and harmonic signal separation, which acts to separate linear and nonlinear signals so as to enable the identification of non-linear (higher harmonics of the fundamental frequency) echo signals returned from tissue and micro-bubbles. The signal processor may also perform additional signal enhancement such as speckle reduction, signal compounding, and noise elimination. The band-pass filter in the signal processor can be a tracking filter, with its pass band sliding from a higher frequency band to a lower frequency band as echo signals are received from increasing depths, thereby rejecting noise at higher frequencies from greater depths that is typically devoid of anatomical information.

The beamformers for transmission and for reception are implemented in different hardware and can have different functions. Of course, the receiver beamformer is designed to take into account the characteristics of the transmission beamformer. In FIG. 1 only the receiver beamformers 12, 20 are shown, for simplicity. In the complete system, there will also be a transmission chain with a transmission micro beamformer, and a main transmission beamformer.

The function of the micro beamformer 12 is to provide an initial combination of signals in order to decrease the number of analog signal paths. This is typically performed in the analog domain.

The final beamforming is done in the main beamformer 20 and is typically after digitization.

The transmission and reception channels use the same transducer array 6 which has a fixed frequency band. However, the bandwidth that the transmission pulses occupy can vary depending on the transmission beamforming used. The reception channel can capture the whole transducer bandwidth (which is the classic approach) or, by using bandpass processing, it can extract only the bandwidth that contains the desired information (e.g. the harmonics of the main harmonic).

The RF signals may then be coupled to a B mode (i.e. brightness mode, or 2D imaging mode) processor 26 and a Doppler processor 28. The B mode processor 26 performs amplitude detection on the received ultrasound signal for the imaging of structures in the body, such as organ tissue and blood vessels. In the case of line-by-line imaging, each line (beam) is represented by an associated RF signal, the amplitude of which is used to generate a brightness value to be assigned to a pixel in the B mode image. The exact location of the pixel within the image is determined by the location of the associated amplitude measurement along the RF signal and the line (beam) number of the RF signal. B mode images of such structures may be formed in the harmonic or fundamental image mode, or a combination of both as described in U.S. Pat. No. 6,283,919 (Roundhill et al.) and U.S. Pat. No. 6,458,083 (Jago et al.) The Doppler processor 28 processes temporally distinct signals arising from tissue movement and blood flow for the detection of moving substances, such as the flow of blood cells in the image field. The Doppler processor 28 typically includes a wall filter with parameters set to pass or reject echoes returned from selected types of materials in the body.

The structural and motion signals produced by the B mode and Doppler processors are coupled to a scan converter 32 and a multi-planar reformatter 44. The scan converter 32 arranges the echo signals in the spatial relationship from which they were received in a desired image format. In other words, the scan converter acts to convert the RF data from a cylindrical coordinate system to a Cartesian coordinate system appropriate for displaying an ultrasound image on an image display 40. In the case of B mode imaging, the brightness of pixel at a given coordinate is proportional to the amplitude of the RF signal received from that location. For instance, the scan converter may arrange the echo signal into a two dimensional (2D) sector-shaped format, or a pyramidal three dimensional (3D) image. The scan converter can overlay a B mode structural image with colors corresponding to motion at points in the image field, where the Doppler-estimated velocities to produce a given color. The combined B mode structural image and color Doppler image depicts the motion of tissue and blood flow within the structural image field. The multi-planar reformatter will convert echoes that are received from points in a common plane in a volumetric region of the body into an ultrasound image of that plane, as described in U.S. Pat. No. 6,443,896 (Detmer). A volume renderer 42 converts the echo signals of a 3D data set into a projected 3D image as viewed from a given reference point as described in U.S. Pat. No. 6,530,885 (Entrekin et al.).

The 2D or 3D images are coupled from the scan converter 32, multi-planar reformatter 44, and volume renderer 42 to an image processor 30 for further enhancement, buffering and temporary storage for display on an image display 40. The imaging processor may be adapted to remove certain imaging artifacts from the final ultrasound image, such as: acoustic shadowing, for example caused by a strong attenuator or refraction; posterior enhancement, for example caused by a weak attenuator; reverberation artifacts, for example where highly reflective tissue interfaces are located in close proximity; and so on. In addition, the image processor may be adapted to handle certain speckle reduction functions, in order to improve the contrast of the final ultrasound image.

In addition to being used for imaging, the blood flow values produced by the Doppler processor 28 and tissue structure information produced by the B mode processor 26 are coupled to a quantification processor 34. The quantification processor produces measures of different flow conditions such as the volume rate of blood flow in addition to structural measurements such as the sizes of organs and gestational age. The quantification processor may receive input from the user control panel 38, such as the point in the anatomy of an image where a measurement is to be made.

Output data from the quantification processor is coupled to a graphics processor 36 for the reproduction of measurement graphics and values with the image on the display 40, and for audio output from the display device 40. The graphics processor 36 can also generate graphic overlays for display with the ultrasound images. These graphic overlays can contain standard identifying information such as patient name, date and time of the image, imaging parameters, and the like. For these purposes the graphics processor receives input from the user interface 38, such as patient name. The user interface is also coupled to the transmit controller 18 to control the generation of ultrasound signals from the transducer array 6 and hence the images produced by the transducer array and the ultrasound system. The transmit control function of the controller 18 is only one of the functions performed. The controller 18 also takes account of the mode of operation (given by the user) and the corresponding required transmitter configuration and band-pass configuration in the receiver analog to digital converter. The controller 18 can be a state machine with fixed states.

The user interface is also coupled to the multi-planar reformatter 44 for selection and control of the planes of multiple multi-planar reformatted (MPR) images which may be used to perform quantified measures in the image field of the MPR images.

The present disclosure relates to a process for analyzing a plurality of ultrasound images, such as those generated by the previously described ultrasound image. The process may be performed by a processor the ultrasound image, such as the graphics processor 36, the image processor 30 and/or a separate/dedicated processing system (not shown).

Figure 2:
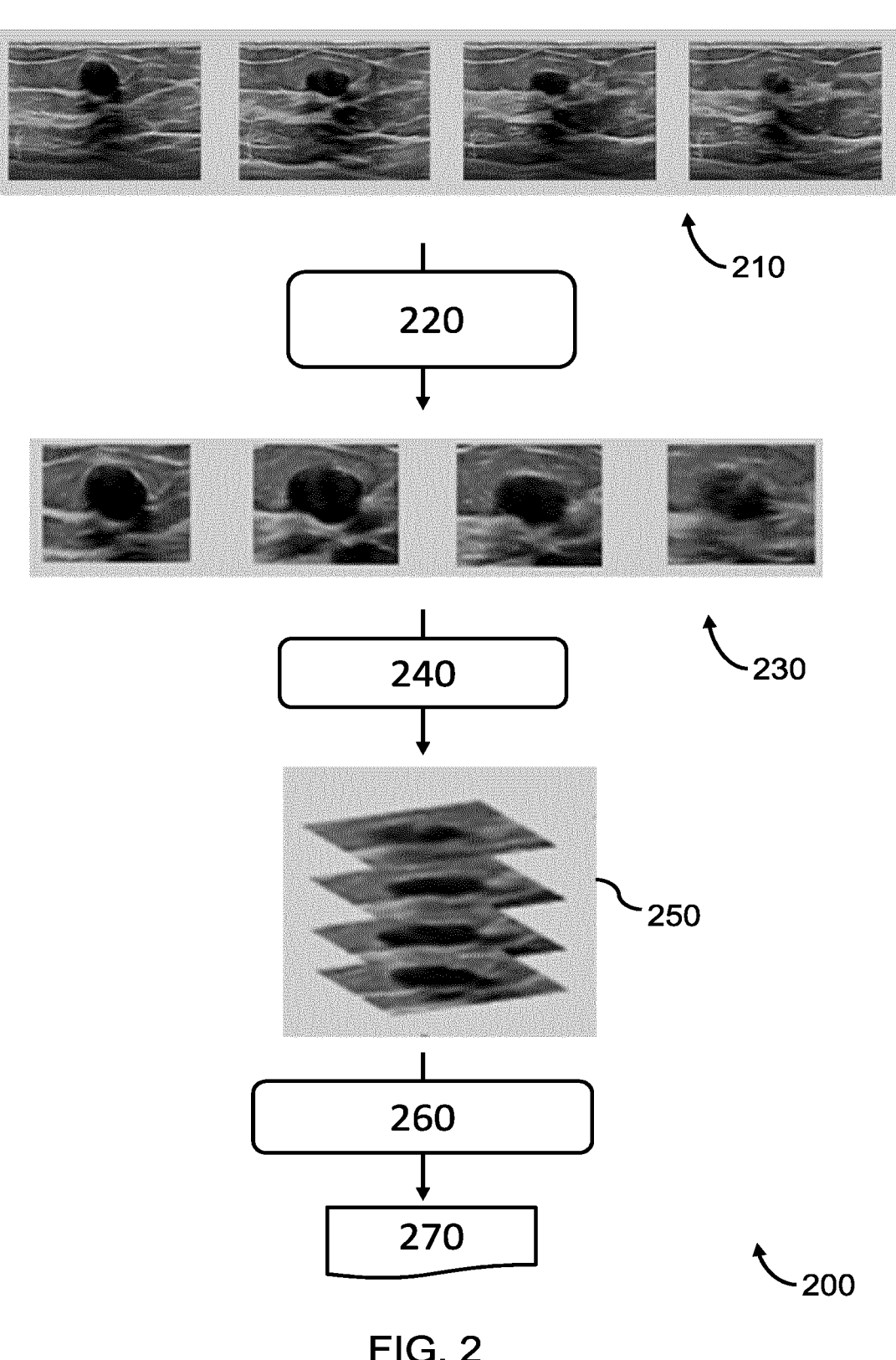
FIG. 2 illustrates a workflow for contextually understanding embodiments.

FIG. 2 schematically illustrates a workflow 200 for understanding an approach adopted by an embodiment of the invention. The workflow represents a process carried out by a processing system.

The workflow includes processing a plurality of ultrasound images 210, which are all of the same resolution. The plurality of ultrasound images are ultrasound images of an individual, and in particular, ultrasound images of a same anatomical area of the individual (and preferably taken from a same or similar viewpoint, e.g. with a substantially stationary imaging probe). Preferably, each ultrasound image is a two-dimensional image, although this is not essential (e.g. 3D ultrasound images could be used).

An ultrasound image is any image that has been obtained using an ultrasound imaging process, e.g. using an ultrasound imaging system such as that previously described. In some examples, an "original" ultrasound image undergoes additional processing (e.g. using one or more filters and/or one or more layers of a neural network) before being used as an ultrasound image for the purposes of the method/workflow. Thus, an ultrasound image may be a feature space image or an image space ultrasound image.

In particularly preferable examples, the plurality of ultrasound images comprises a sequence of ultrasound images, such as a sequence of ultrasound images captured by a same ultrasound imaging probe at different time. Preferably, the order of the sequence of ultrasound images is dependent upon a time at which each ultrasound image was captured. For example, the sequence may comprise sequential frames of an ultrasound video.

Each of the plurality of ultrasound images is processed, in a process 220, to identify regions of interest within each ultrasound image. A region of interest is a part or fraction of the ultrasound image (i.e. not the entire ultrasound image) that represents an area having/containing a potential lesion of the individual.

A lesion may comprise one or more of the following: a growth, a tumor, an abscess, a nodule, a swelling, a protuberance, an ulcer or any other suitable feature that results from damage, disease or injury within an individual. Mechanisms for identifying regions of interest within an ultrasound image are well known to the skilled person, and may employ, for instance, machine-learning methods, edge detection algorithms, image segmentation techniques and so on.

Regions of interest 230 then undergo a grouping or clustering process 240, in which similar regions of interest are grouped together. Put another way, regions of interest are grouped (e.g. into one or more groups of regions of interest) based on a similarity between the regions of interest. The similarity between the regions of interest may be defined based on a similarity of content of the regions of interest. In particular, regions of interest may be grouped together if it is predicted that they identify a same potential lesion of the individual.

Each group of regions of interest 250, of which only one example is illustrated, is then processed in a process 260 using a machine-learning method to generate a predictive indicator 270 that indicates a likelihood that the group of regions of interest contains a lesion in the individual.

The predictive indicator 270 may comprise binary, categorical or numerical data representing a likelihood that the group contains a lesion. As one example, the predictive indicator may be a binary indicator (e.g. "0" or "1") that indicates a prediction of whether or not the groups of regions of interest contains a lesion. As another example, the predictive indicator may be a probability (i.e. a numeric indicator) that the groups of regions of interest contains a lesion. The numeric indicator may be on the scale of 0 to 1, 0 to 10, 1 to 10, 0 to 100 or 1 to 100 (although other examples could be used). As yet another example, the predictive indicator may be a categorical indicator that indicates a categorical indication of likelihood that the groups of regions of interest contains a lesion (e.g. "Likely", "Unlikely", "Highly Likely", "Neither Likely nor Unlikely" and so on).

The proposed approach thereby performs a two-step process for predicting a likelihood that lesions are present in an individual using a plurality of ultrasound images. Each ultrasound image is separately/individually processed to identify regions of interest, being areas/parts of the ultrasound image that potentially depict a lesion (i.e. regions that are candidates for containing a lesion). Similar regions of interest are then grouped together, and then processed using a machine-learning method to generate a predictive indicator responsive to a likelihood that the group depicts a lesion. The processing using the group effectively confirms or rejects a proposal that each region of interest in the group depicts a lesion (this proposal being suggested by the processing of each individual ultrasound image).

The proposed approach avoids a need to perform complex, high-intensity processing of all ultrasound images at a same time, by separately processing each individual ultrasound image, before then processing groups of parts of the ultrasound images. The inventors have recognized that the proposed approach can significantly decrease a false positive rate whilst retaining high accuracy/precision of predicting a lesion likelihood.

Now that a general overview of the workflow has been described, a more complete example of how to perform the exemplary workflow will be hereafter provided.

Figure 3:
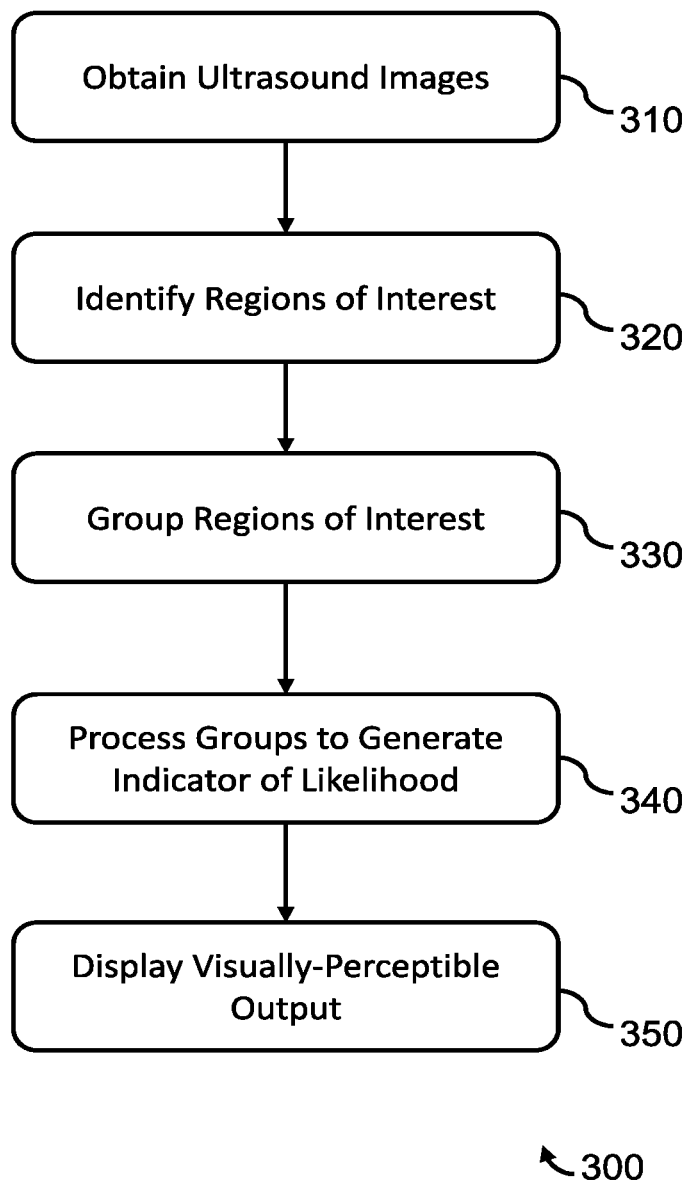
FIG. 3 illustrates a method according to an embodiment.

FIG. 3 illustrates a method 300 according to an embodiment. The method 300 may be carried out by a processing system according to an embodiment.

The method 300 comprises a step 310 of obtaining a plurality of ultrasound images of the individual. The plurality of ultrasound images may be as previously described with reference to FIG. 2. For case of explanation, the illustrated ultrasound images are image-space ultrasound images (i.e. each pixel directly represents a part of the individuals anatomy).

In particular, the ultrasound images are preferably two-dimensional ultrasound images, although the use of 3D ultrasound images is also possible. Preferably, the plurality of ultrasound images comprises a sequence of ultrasound images, e.g. where an ultrasound image sequentially after or later than another ultrasound image was captured at a later point in time than the other ultrasound image. In some examples, the plurality of ultrasound images comprises (sequential) frames from an ultrasound video.

The ultrasound images are then processed in a step 320 that comprises identifying one or more regions of interest in the ultrasound images, each region of interest being a part of the ultrasound image that represents an area having a potential lesion in the individual. Thus, a region of interest is itself an ultrasound image, being a part of a larger ultrasound image.

Processes for identifying regions of interest in an ultrasound image would be readily apparent to the skilled person and may employ machine-learning methods (such as neural networks or naïve Bayesian classifiers) to identify any parts of the ultrasound images that contain or represent a potential lesion in the individual. Typically, a region of interest is defined by identifying (the co-ordinates of) a box or volume that defines the outer bounds of an area or volume that contains a potential lesion of the individual. Thus, each region of interest is a particular part of an ultrasound image.

Preferably, each region of interest is no greater than 0.4 times the size of the ultrasound image, e.g. no greater than 0.25 times the size of the ultrasound image. The smaller the region of interest, the greater the reduction in computational complexity of processing a group of regions of interest (compared to the whole ultrasound image).

The regions of interest may be processed to remove or delete any duplicated regions of interest (e.g. regions of interest in a same ultrasound image that identify a same potential lesion). This may be performed for example, by processing each ultrasound image to identify any regions of interest in that ultrasound image that overlap one another by more than a predetermined amount (e.g. have an Intersection over Union value exceeding a predetermined value) and deleting one or more of the overlapping regions of interest. The deleted region(s) of interest may be the region(s) of interest associated with a lowest confidence/probability that it identifies a potential lesion. Such confidence/probability values can be generated if a region of interest is identified using a machine-learning approach, although other techniques also generate such confidence/probability measures.

The method 300 then performs a step 330 of grouping or clustering the identified regions of interest to form groups of regions of interest. This grouping is performed based on a similarity of the identified regions of interest to one another. Each group may be adapted/configured to contain regions of interest that depict/have a same potential lesion.

Step 330 may be performed by linking or associating regions of interest of different ultrasound images together. Linked regions of interest are those that are believed to contain the same potential lesion. Step 330 may then create or form a group of regions of interest by grouping or clustering linked regions of interest into a single group, e.g. if they meet certain requirements.

Preferably, each group contains no more than one region of interest from any given ultrasound image (i.e. each ultrasound image can only contribute up to one region of interest to a group of ultrasound images).

In particularly preferable examples, where the plurality of ultrasound images comprises a sequence of ultrasound images, each group of regions of interest comprises only regions of interest from sequentially adjacent ultrasound images. In other words, each region of interest (in a particular group of regions of interest) may be from an ultrasound image that is sequentially adjacent (in the sequence of ultrasound images) to an ultrasound image that contains another region of interest (in the particular group of regions of interest).

This approach means that groups of regions of interest can be constructed by only comparing the regions of interest from sequentially adjacent (i.e. immediately before or immediately after) ultrasound images to one another, to effectively construct a sequence of regions of interest. This produces groups of regions of interest that are sequentially related (e.g. temporally related) to one another, providing additional information for aiding in subsequent analysis of the groups of regions of interest.

This approach has the advantage of providing groups of regions of interest that are sequential to one another, providing helpful contextual information for later analysis (e.g. as sequence information may provide an important indicator as to whether a lesion is or is not present), as well as reducing a number of comparisons that need to be made (as only regions of interest in sequentially adjacent ultrasound images need to be compared to one another).

In other words, step 330 may be performed by linking or associating regions of interest of sequentially adjacent ultrasound images together, before creating a group of regions of interest by grouping linked regions of interest into a single group.

In a first scenario, step 330 may comprise determining a similarity measure between different regions of interest based on a relative overlap between the areas occupied by each region of interest in their respective ultrasound images. Regions of interest may be grouped together (or linked/ associated with one another) if this similarity measure exceeds some predetermined threshold.

For instance, a size of an overlap between an area occupied by one region of interest in an ultrasound image and an area occupied by another region in another ultrasound image may be used as a similarity measure. The size of the overlap may be determined using an intersection over union (IoU) evaluation metric. This procedure can establish a link between regions of interest across different ultrasound images.

As an example only, consider a scenario in which a region of interest of a first ultrasound image is a box defined by co-ordinates $(X_1, Y_1, X_2, Y_X)$, and a region of interest of a second ultrasound image is a box defined by co-ordinates $(X_3, Y_3, X_4, Y_4)$. This co-ordinate information can be used to identify a size of relative overlap between the two regions of interest, and can be used to calculate an IoU measure, as the co-ordinate information defines the coverage or extent of each region of interest.

In some examples, regions of interest may be considered to be sufficiently similar (i.e. for placement in a same group) if the IoU measure is greater than some predetermined value, which is preferably no less than 0.4, e.g. no less than 0.5, e.g. no less than 0.6.

In a second scenario, step 330 comprises grouping regions of interest based on metadata associated with each region of interest.

This metadata may, for instance, represent features of the regions of interest. Example metadata for a region of interest includes a location of the region of interest (e.g. a position of a center of the region of interest), a geometry (e.g. shape) and/or size of the region of interest, a confidence value of the region of interest (e.g. a value representing a confidence or probability that the region of interest contains a potential lesion—as may be provided by a machine learning method) and/or a feature map for the region of interest.

A feature map of a region of interest is a map generated by applying one or more filters to a region of interest, such as a convolutional filter or the like. In particular, a feature map is a map generated by applying one or more layers of a neural network to a region of interest. The meaning of the term feature map is well understood in the machine-learning field.

In some examples, a classifier, e.g. a machine-learning method, may process each region of interest to classify the region of interest into one of a plurality of classifications. A group of regions of interest may, for example, only contain regions of interest having a same classification.

Preferably, a combination of the above-described approaches is used. In particular, for a plurality of images formed of a sequence of plurality images, each group of regions of interest may contain only regions of interest from ultrasound images that are sequentially adjacent to one or two other ultrasound images that provide one or more other regions of interest for the group of regions of interest and which overlap one another by more than a predetermined amount.

The method 300 comprises a step 340 of processing groups of regions of interest, using a machine-learning method, to generate a predictive indicator that indicates a likelihood that the group of regions of interest contains a lesion in the individual.

In particularly preferable examples, the output of the machine-learning method is data that changes responsive to a predicted likelihood that the group of regions contains a lesion, e.g. in the form of a binary indicator, a categorical indicator and/or a numerical indicator.

This process makes use of multiple, similar regions of interest in order to predict whether or not they contain or depict a lesion in the individual. This provides additional, contextually relevant information for generating the predictive indicator, e.g. compared to simply processing a single ultrasound image alone. This approach can thereby provide a more accurate mechanism for determining a likelihood that a lesion is present (in each group of regions of interest), as additional contextual information is provided.

By using groups of regions of interest, the proposed approach also avoids a need to process groups of full-size ultrasound images, which would be computationally expensive and/or require significant additional storage space.

It is further noted that the proposed approach also increases an accuracy of identifying lesions in an individual, as it makes use of a two-step process to identify or predict the likely presence of lesions.

Step 340 may comprise, for each group of regions of interest, processing the regions of interest to generate a sequence of regions of interest. The sequence may be a temporal sequence, so that regions of interest are ordered sequentially based on the time at which the original ultrasound image (for each region of interest) was originally captured. The sequence of regions may then be processed using a machine-learning method to generate the predictive indicator.

The order of the sequence of regions of interest may match, if obtained from a sequence of ultrasound image, an order of the sequence of ultrasound images from which the regions of interest are obtained.

This sequence of the regions of interest may be called a "tube" or "tubelet", and effectively represents a sequence of (parts of an image) that depict a same potential lesion. For instance, the "tube" may effectively represent a video of a potential lesion, which is sized/shaped to fit around the potential lesion (rather than a video of the entire area imaged by the ultrasound imaging probe).

In some examples, the sequence of regions of interest may comprise a stack of the regions of interest in the groups of regions of interest. For instance, where each region of interest is a two-dimensional image, the sequence of regions of interest may comprise a 3D volume representing a simple stacking of the two-dimensional images on top of one another.

Put yet another way, the groups of regions of interest may be effectively treated as a "volume", which can be classified or processed using a machine-learning method. That is, the sequence of regions of interest may be a single data structure containing the stacked regions of interest, i.e. a combination of all the regions of interest.

The input to the machine-learning method may be the group of regions themselves, the sequence of the regions of interest, and/or other data derived from the group of regions of interest, e.g. one or more feature maps derived by processing the groups of regions of interest (e.g. using one or more filters or layers of a neural network).

A machine-learning algorithm is any self-training algorithm that processes input data in order to produce or predict output data. For the purposes of step 340, the input data comprises data derived from a group of regions of interest and the output data comprises a predictive indicator that indicates a likelihood that the group of regions of interest contains a lesion in the individual.

Suitable machine-learning algorithms for being employed in the present invention will be apparent to the skilled person. Examples of suitable machine-learning algorithms include decision tree algorithms and artificial neural networks (e.g. CNNs, RNNS and/or LSTM). Other machine-learning algorithms such as logistic regression, support vector machines or Naïve Bayesian models are suitable alternatives.

The structure of an artificial neural network (or, simply, neural network) is inspired by the human brain. Neural networks are comprised of layers, each layer comprising a plurality of neurons. Each neuron comprises a mathematical operation. In particular, each neuron may comprise a different weighted combination of a single type of transformation (e.g. the same type of transformation, sigmoid etc. but with different weightings). In the process of processing input data, the mathematical operation of each neuron is performed on the input data to produce a numerical output, and the outputs of each layer in the neural network are fed into the next layer sequentially. The final layer provides the output.

Methods of training a machine-learning algorithm are well known. Typically, such methods comprise obtaining a training dataset, comprising training input data entries and corresponding training output data entries (commonly labelled "ground truth" data). An initialized machine-learning algorithm is applied to each input data entry to generate predicted output data entries. An error between the predicted output data entries and corresponding training output data entries is used to modify the machine-learning algorithm. This process can be repeated until the error converges, and the predicted output data entries are sufficiently similar (e.g. ±1%) to the training output data entries. This is commonly known as a supervised learning technique.

For example, where the machine-learning algorithm is formed from a neural network, (weightings of) the mathematical operation of each neuron may be modified until the error converges. Known methods of modifying a neural network include gradient descent, backpropagation algorithms and so on.

The training input data entries correspond to example data derived from groups of regions of interest (e.g. the groups themselves). The training output data entries correspond to example predictions as to a likelihood that a lesion is present in the group (in the form of binary, categorical or numerical data).

The method 300 may further comprise a step 350 of displaying a visually perceptible output, at a display device, responsive to the predictive indicator.

Thus, step 350 may comprise controlling a display device to provide a visually-perceptible output which is responsive to the predictive indicator (for each group of regions), i.e. to indicate a predicted likelihood that a lesion is present in an individual. The indicator may, for instance, provide a predicted probability and/or binary indicator (e.g. indicating "Lesion Present" or "No Lesion Present") that a lesion is present in an individual.

As another example, if the predictive indicator is a numerical value indicating a predicted probability, and one of the predictive indicators has a value exceeding a predetermined value, then step 350 may comprise controlling a display device to indicate that a lesion is present.

In some examples, the visually perceptible output indicates which (if any) of the groups of regions of interest are predicted to contain or depict a lesion. This may be in the form of a probability and/or binary indicator, e.g. for each group of regions or for only those regions that are considered likely to contain a lesion (e.g. have a likelihood exceeding some predetermined threshold).

In some examples, in response to determining that at least one of the groups of regions of interest contains a lesion, e.g.

if a predicted likelihood exceeds some threshold, step 350 may comprise identifying a position of the identified lesion with respect to a displayed ultrasound image of the patient; and overlaying a visually perceptible output (e.g. an annotation, box or the like) on the displayed ultrasound image responsive to the identified position of the lesion. The position of the identified lesion may be the position of the region of interest (of the group of regions of interest predicted to contain a lesion) within the displayed ultrasound image. In particular, the visually perceptible output may overlay a position of the lesion, e.g. at the position of the region of interest predicted to contain a lesion, in the ultrasound image. The ultrasound image may be one of the plurality of ultrasound images that contained a region of interest which formed part of the group of regions of interest for which the presence of a lesion has been identified.

In some examples, all regions of interest are identified (e.g. using respective markers), with regions of interest in groups of regions of interest predicted to contain a lesion (e.g. with a probability greater than some predetermined value) being highlighted or otherwise emphasized, e.g. with a particular color, pattern or the like. This facilitates improved case in identifying potential areas in which lesions may be found (e.g. for diagnostic purposes), whilst also providing information on the automated prediction of a likelihood that the areas contain a lesion.

In some examples, information on the predicted likelihood that the region contains a lesion of interest is display, e.g. using a shading or transparency adjustment technique.

In some examples, the display device may be configured to sequentially display each ultrasound image of the plurality of ultrasound images (e.g. play an ultrasound video). Step 350 may comprise, in response to determining that at least one of the groups of regions of interest is likely to contain a lesion (e.g. by processing the predictive indicator), controlling the display device to provide a visually perceptible output of the position of the region of interest (from the group of regions of interest) associated with the currently displayed ultrasound image with respect to the currently displayed ultrasound image. In this way, the relative position of the lesion associated with the group of regions of interest can be tracked or displayed over time.

FIGS. 2 and 3 are used to describe a relatively simple embodiment in which each of the plurality of ultrasound images comprises an image-space ultrasound image.

However, as previously indicated, in some examples each of the plurality of ultrasound images may comprise a feature-space ultrasound image, i.e. a feature space image. A feature space image may be a "traditional" ultrasound image (an "image space image") that has undergone further processing, e.g. using one or more filters and/or layers of a neural network to generate a feature space image.

In some examples, these feature space images are processed in an identical manner to previously described ultrasound images. However, in other examples, some additional processing may be performed to identify the (groups of) regions of interest.

Figure 4:
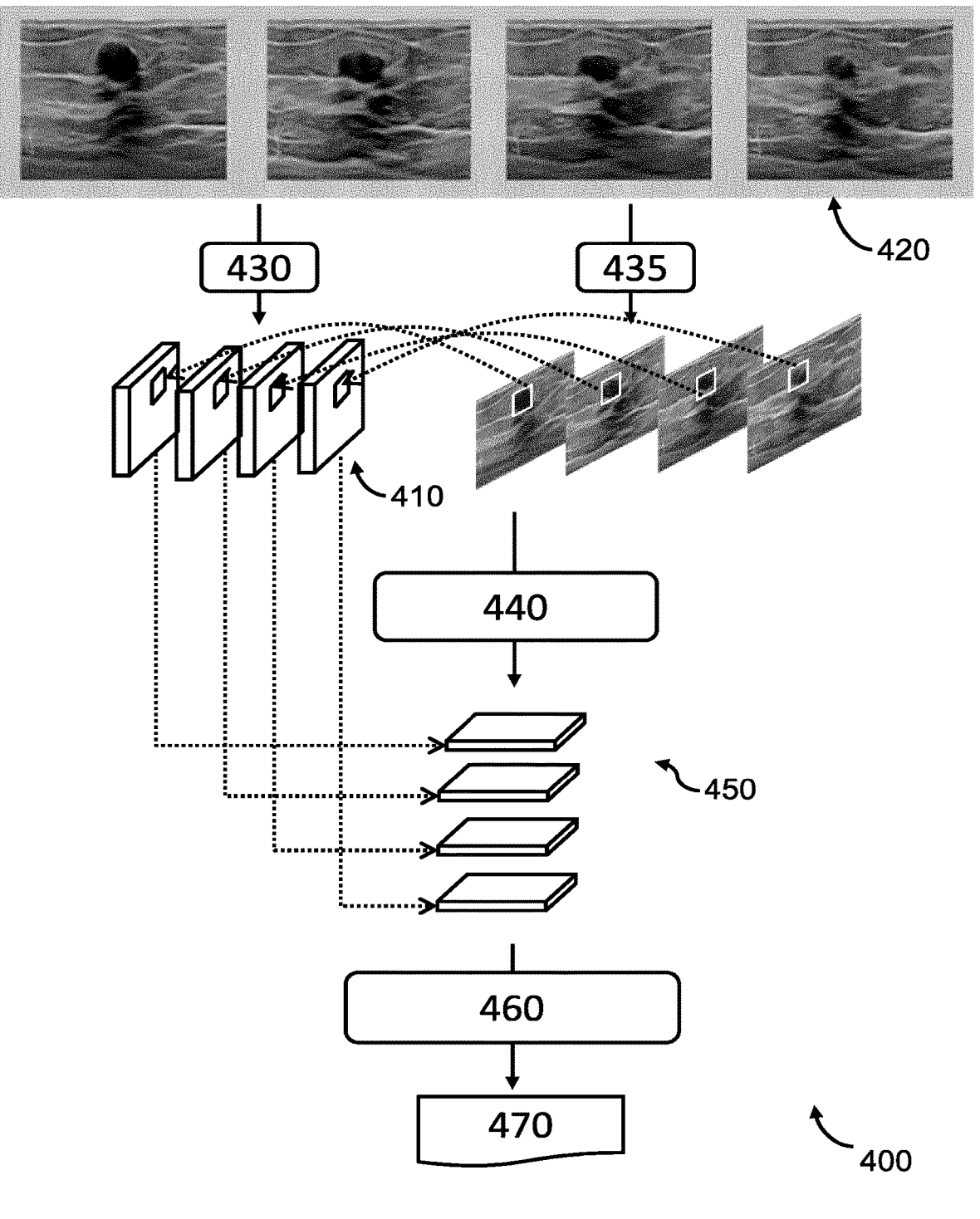
FIG. 4 illustrates a method according to an embodiment.

FIG. 4 illustrates a process in which the plurality of ultrasound images comprises a plurality of feature space images 410, each feature space image being derived from a respective image space (ultrasound) image 420 (e.g. as a result of a feature extraction process 430).

Thus, the step of obtaining a plurality of ultrasound images may comprise obtaining a plurality of feature space ultrasound images. This may be performed by processing, in a feature extraction process 430, a plurality of image space ultrasound images to generate the feature space ultrasound images.

The process of identifying regions of interest in the ultrasound images may comprise independent processing the feature space ultrasound images to identify the regions of interest in the feature space ultrasound images.

In an alternative embodiment, this process comprises a process 435 of identifying regions of interest in the image space ultrasound images 420. This may be performed using any previously described mechanism, e.g. using a machine-learning method. The regions of interest in the feature space ultrasound images may then be determined based on the regions of interest in the image space ultrasound images, as schematically illustrated using dotted lines. In particular, a spatial relationship between different areas of the feature space ultrasound images and the image space ultrasound images is known, and so can be used to identify the relevant regions of interest in the feature space ultrasound images.

Thus, the step of identifying regions of interest in the ultrasound images may comprise identifying regions of interest by first identifying regions of interest in original ultrasound images (used to derive the plurality of ultrasound images), before identifying regions of interest in the plurality of ultrasound images based on the identified regions of interest in the original ultrasound images.

The regions of interest in the plurality of (feature space) ultrasound images are then grouped in a process 440 to generate one or more groups 460 of regions of interest.

Each group of regions of interest 450 are processed using a machine-learning method to generate the predictive indicator 470 that indicates a likelihood that the group of regions of interest contains a lesion. This may be performed using any previously described approach.

Figure 5:
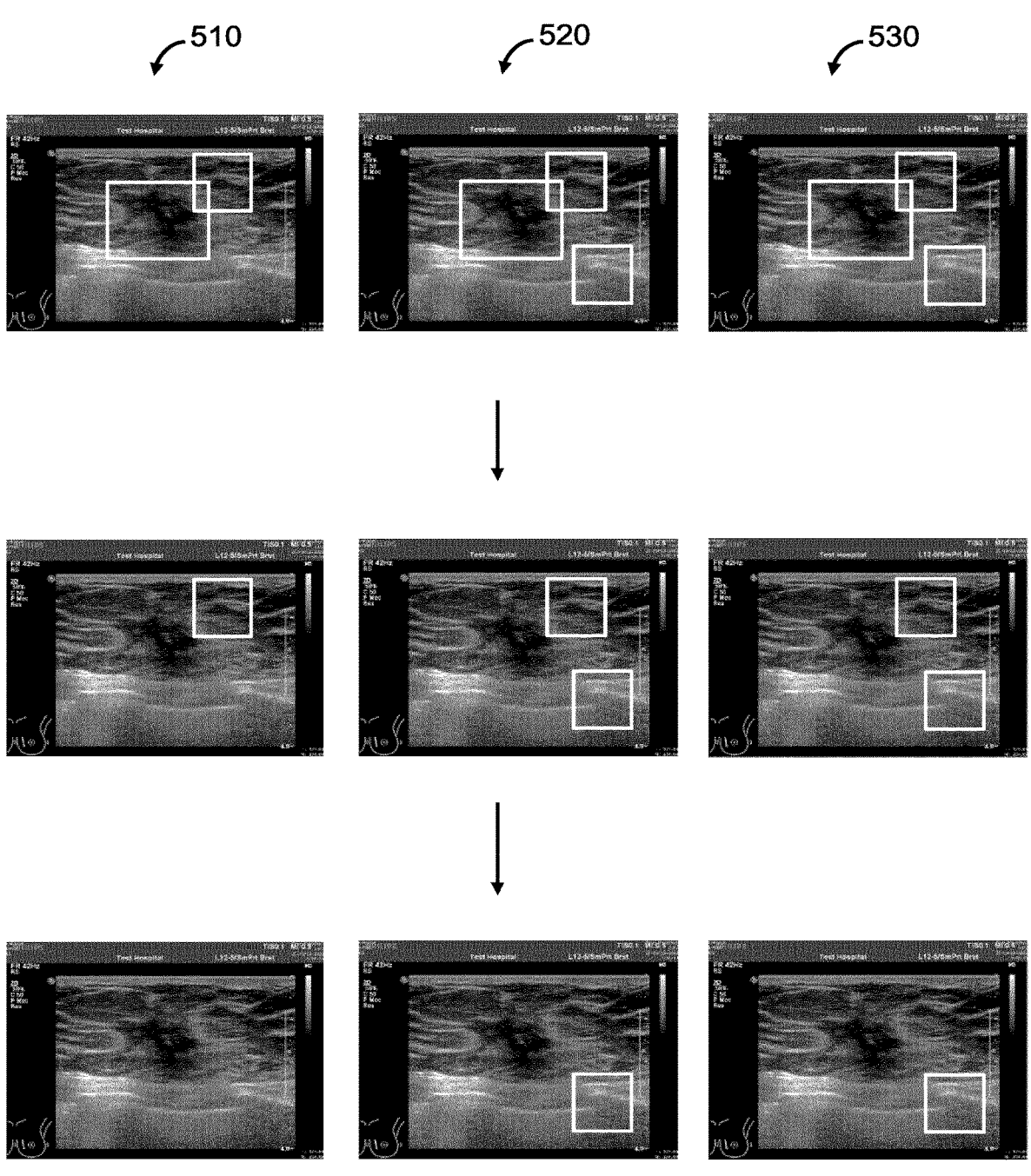
FIG. 5 illustrates a method for grouping regions of interest.

FIG. 5 illustrates an exemplary process for grouping regions of interest.

In particular. FIG. 5 illustrates a process for grouping regions of interest from consecutive ultrasound images within a sequence of ultrasound images (e.g. sequential frames of an ultrasound video).

FIG. 5 illustrates three ultrasound images, all in two-dimensions and having the same resolution. In particular, there is a first ultrasound image 510, a second ultrasound image 520 and a third ultrasound image 530. The ultrasound images form a (temporal) sequence of ultrasound images, e.g. representing frames of an ultrasound video.

Each ultrasound image has been processed to identify regions of interest, e.g. using a machine-learning method. These regions of interest are schematically illustrated in FIG. 5 using boxes.

The regions of interest are then grouped. This is performed by linking or associating regions of interest in adjacent frames if a measure of similarity between the regions of interest (in adjacent frames) exceeds some predetermined threshold. The measure of similarity may be an intersection over union (IoU) value, which is calculated by dividing the size of the overlap between the regions (i.e. the size of an overlap if the regions were located in a same ultrasound image) by the size of the union between the regions.

A sequence of regions of interest is then obtained by selecting linked regions of interest of different ultrasound images. In particular, an obtained sequence of regions of interest may be a sequence comprising up to one region of interest from each ultrasound image, in which each region of interest in the sequence is linked or associated with another region of interest in the sequence. The order of the sequence of regions of interest may match the order of the sequence of ultrasound images from which they are obtained.

The regions that have been placed into a sequence of regions of interest may then be deleted (with the sequence of regions of interest being preserved) and the process repeated. This process is schematically illustrated using the arrows of FIG. 5.

Figure 6:
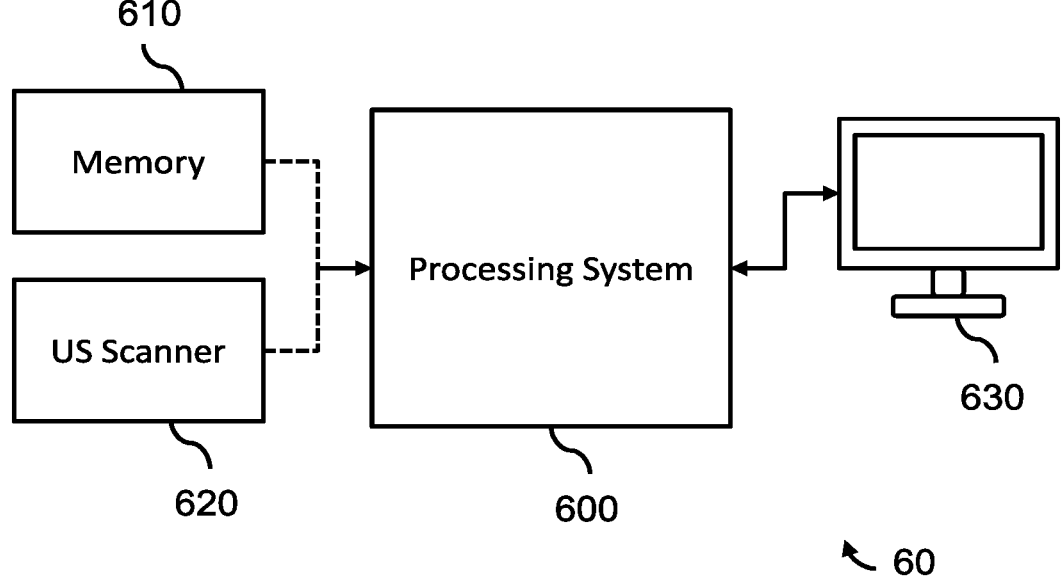
FIG. 6 illustrates a processing system according to an embodiment.

FIG. 6 illustrates a processing system 600 according to an embodiment. The processing system is illustrated in the context of an overall ultrasound imaging system 60.

The processing system 600 is configured to obtain a plurality of ultrasound images of the individual. The plurality of ultrasound images may, for instance, be obtained from a memory 610 and/or an ultrasound scanner 620, configured to generate ultrasound images.

The processing system 600 is also configured to identify regions of interest in the ultrasound images, each region of interest being a part of the ultrasound image that represents an area having a potential lesion in the individual.

The processing system 600 is also configured to group regions of interest, from different ultrasound images, together based on a similarity of the regions of interests; and process each group of regions of interest using a machine-learning method to predict whether or not the group of regions of interest contains a lesion in the individual.

The processing system 600 may also be configured to display a visually-perceptible output, at a display device, responsive to each predictive indicator.

As previously explained, the processing system 600 may be appropriately adapted to carry out any method herein described, mutatis mutandis, and the skilled person would be readily capable of appropriately adapting the processing system 600.

Figure 7:
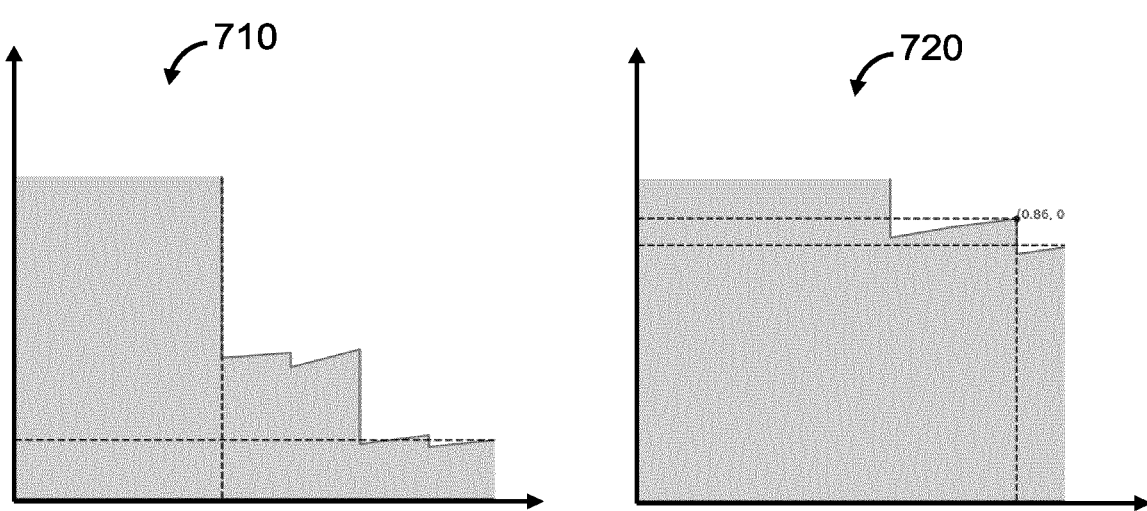
FIG. 7 illustrates the effect of embodiments.

FIG. 7 illustrates the effect of the proposed approach for predicting whether or not an individual has one or more lesions.

A first graph 710 illustrates the recall precision curve (recall on the x-axis, precision on the y-axis) for correctly identifying a lesion within a two-dimensional ultrasound image using a known two-dimensional neural network analysis approach. This graph has been produced using benchmark data. In particular, the first graph 710 illustrates the recall precision curve resulting from use of lesion detection algorithm using Faster RCNN.

A second graph 720 illustrates the recall precision curve for correctly identifying a lesion within a plurality of ultrasound images by performing a herein disclosed approach. The second graph 720 has been produced using the same benchmark data used to produce the first graph 710.

The first and second graphs 710, 720 are to the same scale (e.g. 0.0 to 1.0 on the x-axis and 0.0 to 1.0 on the y-axis.

With the proposed approach, a higher precision value can be obtained for higher levels of recall, and vice versa. In other words, the improvement of our invention indicates that the use of the additional context provided in a plurality of ultrasound images in the disclosed manner (e.g., making use of an ultrasound video), which context is not present in a simple still image, can reduce false positive detection of lesions and/or missing detections.

Figure 8:
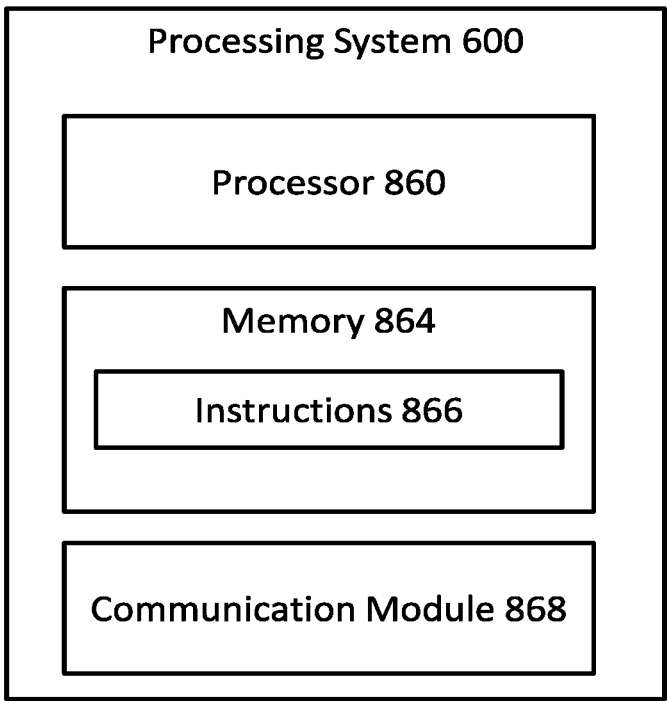
FIG. 8 illustrates a processing system.

FIG. 8 is a schematic diagram of a processing system 600, according to embodiments of the present disclosure. As shown, the processing system 600 may include a (data) processor 860, a memory 864, and a communication module 868. These elements may be in direct or indirect communication with each other, for example via one or more buses.

The processor 860 may include a central processing unit (CPU), a digital signal processor (DSP), an ASIC, a controller, an FPGA, another hardware device, a firmware device, or any combination thereof configured to perform the operations described herein. The processor 860 may also be implemented as a combination of computing devices, e.g., a combination of a DSP and a microprocessor, a plurality of microprocessors, one or more microprocessors in conjunction with a DSP core, or any other such configuration. In some embodiments, the processor is a distributed processing system, e.g. formed of a set of distributed processors.

The memory 864 may include a cache memory (e.g., a cache memory of the processor 860), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 864 includes a non-transitory computer-readable medium. The non-transitory computer-readable medium may store instructions. For example, the memory 864, or non-transitory computer-readable medium may have program code recorded thereon, the program code including instructions for causing the processing system 600, or one or more components of the processing system 600, particularly the processor 860, to perform the operations described herein. For example, the processing system 600 can execute operations of the method 700. Instructions 866 may also be referred to as code or program code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements. The memory 864, with the code recorded thereon, may be referred to as a computer program product.

The communication module 868 can include any electronic circuitry and/or logic circuitry to facilitate direct or indirect communication of data between the processing system 600, the penetration device and/or the user interface (or other further device). In that regard, the communication module 868 can be an input/output (I/O) device. In some instances, the communication module 868 facilitates direct or indirect communication between various elements of the processing circuit 600 and/or the system (FIG. 6).

It will be understood that disclosed methods are preferably computer-implemented methods. As such, there is also proposed the concept of a computer program comprising computer program code for implementing any described method when said program is run on a processing system, such as a computer or a set of distributed processors.

Different portions, lines or blocks of code of a computer program according to an embodiment may be executed by a processing system or computer to perform any herein described method. In some alternative implementations, the functions noted in the block diagram(s) or flow chart(s) may occur out of the order noted in the figures. For example, two blocks shown in succession may, in fact, be executed substantially concurrently, or the blocks may sometimes be executed in the reverse order, depending upon the functionality involved.

The present disclosure proposes a computer program (product) comprising instructions which, when the program is executed by a computer or processing system, cause the computer or processing system to carry out (the steps of) any herein described method. The computer program (product) may be stored on a non-transitory computer readable medium.

Similarly, there is also proposed a computer-readable (storage) medium comprising instructions which, when executed by a computer or processing system, cause the computer or processing system to carry out (the steps of) any herein described method. There is also proposed computer-readable data carrier having stored thereon the computer program (product) previously described. There is also proposed a data carrier signal carrying the computer program (product) previously described.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The disclosed methods are preferably computer-implemented methods, and may be carried out by a suitable processing system. Any herein described processing system may be appropriately adapted to carry out any herein described method, just as any herein described method may be adapted to perform a process carried out by any herein described processing system.

There is also provided a computer program product comprising computer program code means which, when executed on a computing device having a processing system, cause the processing system to perform all of the steps of any herein described method.

A single processor or other unit may fulfill the functions of several items recited in the claims. A computer program may be stored/distributed on a suitable medium, such as an optical storage medium or a solid-state medium supplied together with or as part of other hardware, but may also be distributed in other forms, such as via the Internet or other wired or wireless telecommunication systems.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to". Any reference signs in the claims should not be construed as limiting the scope.

The invention claimed is:

1. A system for predicting a likelihood that an individual has one or more lesions, the system comprising:

a processor; and a non-transitory memory storing instructions that, when executed by the processor, cause the processor to:

obtain a plurality of ultrasound images of the individual, the plurality of ultrasound images comprising a temporal sequence of ultrasound images acquired by an ultrasound imaging system;

identify regions of interest in the plurality of ultrasound images, respectively, each region of interest being a part of an ultrasound image of the plurality of ultrasound images that represents an area having a potential lesion in the individual;

group together regions of interest, from different ultrasound images of the plurality of ultrasound images, based on a similarity of the regions of interests; and process each group of regions of interest using a first machine-learning algorithm to generate a predictive indicator, wherein processing each group of regions of interest comprises generating a sequence of regions of interest using the regions of interest of the group of regions of interest by performing a step comprising stacking the regions of interest, and wherein the predictive indicator indicates a likelihood that the sequence of regions of interest contains a lesion in the individual.

2. The system of claim 1, wherein each ultrasound image is a two-dimensional ultrasound image.

3. The system of claim 1, wherein the instructions cause the processor to identify regions of interest in the ultrasound images by performing a process comprising processing each ultrasound image using a second machine-learning method to identify regions of interest.

4. The system of claim 1, wherein the plurality of ultrasound images comprises a video of ultrasound images.

5. The system of claim 4, wherein an order of the sequence of ultrasound images is dependent upon a time at which each ultrasound image was captured.

6. The system of claim 1, wherein each region of interest is no larger than 0.25 times the size of the ultrasound image.

7. The system of claim 1, wherein the instructions further cause the processor to display a visually-perceptible output, at a display device, responsive to each predictive indicator.

8. The system of claim 7, wherein the instructions further cause the processor to, when at least one predictive indicator indicates that at least one group of regions of interest is likely to contain a lesion:

identify a position of the identified lesion with respect to a displayed ultrasound image of the individual; and overlay the visually-perceptible output on the displayed ultrasound image responsive to the identified position of the lesion.

9. The system of claim 1, wherein the instructions cause the processor to group regions of interest by performing a process comprising:

determining a similarity measure between different regions of interest from different ultrasound images, a similarity measure representing a size of an overlap between the relative area occupied by one region of interest within an ultrasound image and the relative area occupied by another region of interest of another ultrasound image; and grouping two different regions of interest into a same group in response to the similarity measure between the two different regions of interest exceeding a predetermined threshold.

10. The system of claim 1, wherein the instructions cause the processor to group regions of interest by performing a process comprising:

identifying metadata of the region of interest, the metadata providing information on a size, position, confidence and/or appearance of the region of interest; and grouping regions of interest based on the metadata of the regions of interest.

11. The system of claim 1, wherein the instructions further cause the processor to remove a duplicated region of interest in a same ultrasound image as an identified region of interest, the duplicated region of interest land the identified region of interest identifying a same potential legion.

12. A system for predicting a likelihood that an individual has one or more lesions, the system comprising:

a processor; and a non-transitory memory storing instructions that, when executed by the processor, cause the processor to:

obtain a plurality of ultrasound images of the individual, the plurality of ultrasound images comprising a temporal sequence of ultrasound images acquired by an ultrasound imaging system;

identify regions of interest in the plurality of ultrasound images, each region of interest being a part of an ultrasound image of the plurality of ultrasound images that represents an area having a potential lesion in the individual;

group together regions of interest, from different ultrasound images of the plurality of ultrasound images, based on a similarity of the regions of interests; and generate a predictive indicator for each group of regions of interest using a first machine-learning algorithm, wherein the predictive indicator indicates a likelihood that the group of regions of interest contains a lesion in the individual, wherein the plurality of ultrasound images comprises a video of ultrasound images, and wherein, in each group of regions of interest, each region of interest is from an ultrasound image sequentially adjacent to an ultrasound image for another region of interest in the same group of regions of interest.

13. A computer-implemented method for predicting a likelihood that an individual has one or more lesions, the computer-implemented method comprising:

obtaining a plurality of ultrasound images of the individual, the plurality of ultrasound images comprising a temporal sequence of ultrasound images acquired by an ultrasound imaging system;

identifying regions of interest in the plurality of ultrasound images, each region of interest being a part of an ultrasound image of the plurality of ultrasound images that represents an area having a potential lesion in the individual;

grouping together regions of interest, from different ultrasound images of the plurality of ultrasound images, based on a similarity of the regions of interests; and processing each group of regions of interest using a first machine-learning algorithm to generate a predictive indicator, wherein processing each group of regions of interest comprises generating a sequence of regions of interest using the regions of interest of the group of regions of interest by performing a step comprising stacking the regions of interest, and wherein the predictive indicator indicates a likelihood that the sequence of regions of interest contains a lesion in the individual.

14. The method of claim 13, wherein identifying the regions of interest in the ultrasound images comprises processing each ultrasound image using second machine-learning method to identify regions of interest.

15. The method of claim 13, wherein the grouping together the regions of interest comprises:

determining a similarity measure between different regions of interest from different ultrasound images, a similarity measure representing a size of an overlap between the relative area occupied by one region of interest within an ultrasound image and the relative area occupied by another region of interest of another ultrasound image; and grouping two different regions of interest into a same group in response to the similarity measure between the two different regions of interest exceeding a predetermined threshold.

16. The method of claim 13, wherein the grouping together the regions of interest comprises:

identifying metadata of the region of interest, the metadata providing information on a size, position, confidence and/or appearance of the region of interest; and grouping regions of interest based on the metadata of the regions of interest.

\*    \*    \*    \*    \*